United States Patent
Furuya et al.

(10) Patent No.: US 7,965,916 B2
(45) Date of Patent: Jun. 21, 2011

(54) LASER LIGHT SOURCE DEVICE, IMAGE DISPLAY AND ILLUMINATOR

(75) Inventors: Hiroyuki Furuya, Nara (JP); Kazuhisa Yamamoto, Osaka (JP); Kiminori Mizuuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 462 days.

(21) Appl. No.: 12/161,667

(22) PCT Filed: Dec. 5, 2006

(86) PCT No.: PCT/JP2006/324230
§ 371 (c)(1),
(2), (4) Date: Jul. 21, 2008

(87) PCT Pub. No.: WO2007/083452
PCT Pub. Date: Jul. 26, 2007

(65) Prior Publication Data
US 2010/0246207 A1  Sep. 30, 2010

(30) Foreign Application Priority Data
Jan. 23, 2006 (JP) ................................ 2006-013370

(51) Int. Cl.
*H01S 3/00* (2006.01)
*G02B 6/00* (2006.01)
*G02B 6/36* (2006.01)

(52) U.S. Cl. ........ 385/126; 385/127; 385/145; 359/333; 359/341.1; 359/345

(58) Field of Classification Search .................. None
See application file for complete search history.

(56) References Cited

U.S. PATENT DOCUMENTS

| 6,603,905 | B1 | 8/2003 | Ionov | |
|---|---|---|---|---|
| 7,098,992 | B2 * | 8/2006 | Ohtsuki et al. | 355/69 |
| 7,787,506 | B1 * | 8/2010 | Jiang et al. | 372/30 |
| 2004/0012844 | A1 * | 1/2004 | Ohtsuki et al. | 359/341.1 |

FOREIGN PATENT DOCUMENTS

JP  2-43782  2/1990

(Continued)

OTHER PUBLICATIONS

International Search Report issued Feb. 6, 2007 in International (PCT) Application No. PCT/JP2006/324230.

(Continued)

*Primary Examiner* — Charlie Peng
*Assistant Examiner* — Mary A El-Shammaa
(74) *Attorney, Agent, or Firm* — Wenderoth, Lind & Ponack, L.L.P.

(57) ABSTRACT

There is a problem that in the connection portion between a rare-earth-doped double clad fiber and a single mode fiber, pumping light leaks in a portion having the coating, and the fiber generates heat partially with this energy and deteriorates. Also, there is another problem that the output is limited as the oscillation wavelength becomes shorter. Accordingly, in a laser light source device formed by combining a fiber laser and a fiber amplifier, by using the residual pumping light in the fiber laser as the pumping light in the fiber amplifier, it is possible to enhance the reliability by preventing the fiber deterioration caused by the residual pumping light. Further, by amplifying the output in the fiber amplifier in the latter stage without any limitation on the pumping light output, it is possible to increase an output of the oscillation light.

15 Claims, 14 Drawing Sheets

FOREIGN PATENT DOCUMENTS

| | | |
|---|---|---|
| JP | 5-3356 | 1/1993 |
| JP | 5-7038 | 1/1993 |
| JP | 6-75118 | 3/1994 |
| JP | 7-113919 | 5/1995 |
| JP | 7-226551 | 8/1995 |
| JP | 11-121836 | 4/1999 |
| JP | 2002-232046 | 8/2002 |
| JP | 2003-8115 | 1/2003 |
| JP | 2003-258341 | 9/2003 |
| JP | 2003-526929 | 9/2003 |
| JP | 2005-12008 | 1/2005 |
| JP | 2005-93817 | 4/2005 |
| JP | 2005-294570 | 10/2005 |

OTHER PUBLICATIONS

Ken'ichi Kasazumi et al., "A Practical Laser Projector with New Illumination Opitics for Reduction of Speckle Noise", Japanese Journal of Applied Physics, vol. 43, No. 8B, 2004, pp. 5904-5906.

A paper of "Rare-earth-doped Fiber lasers and amplifiers", Marcel Dekker, Inc., 2001, pp. 144-149.

* cited by examiner

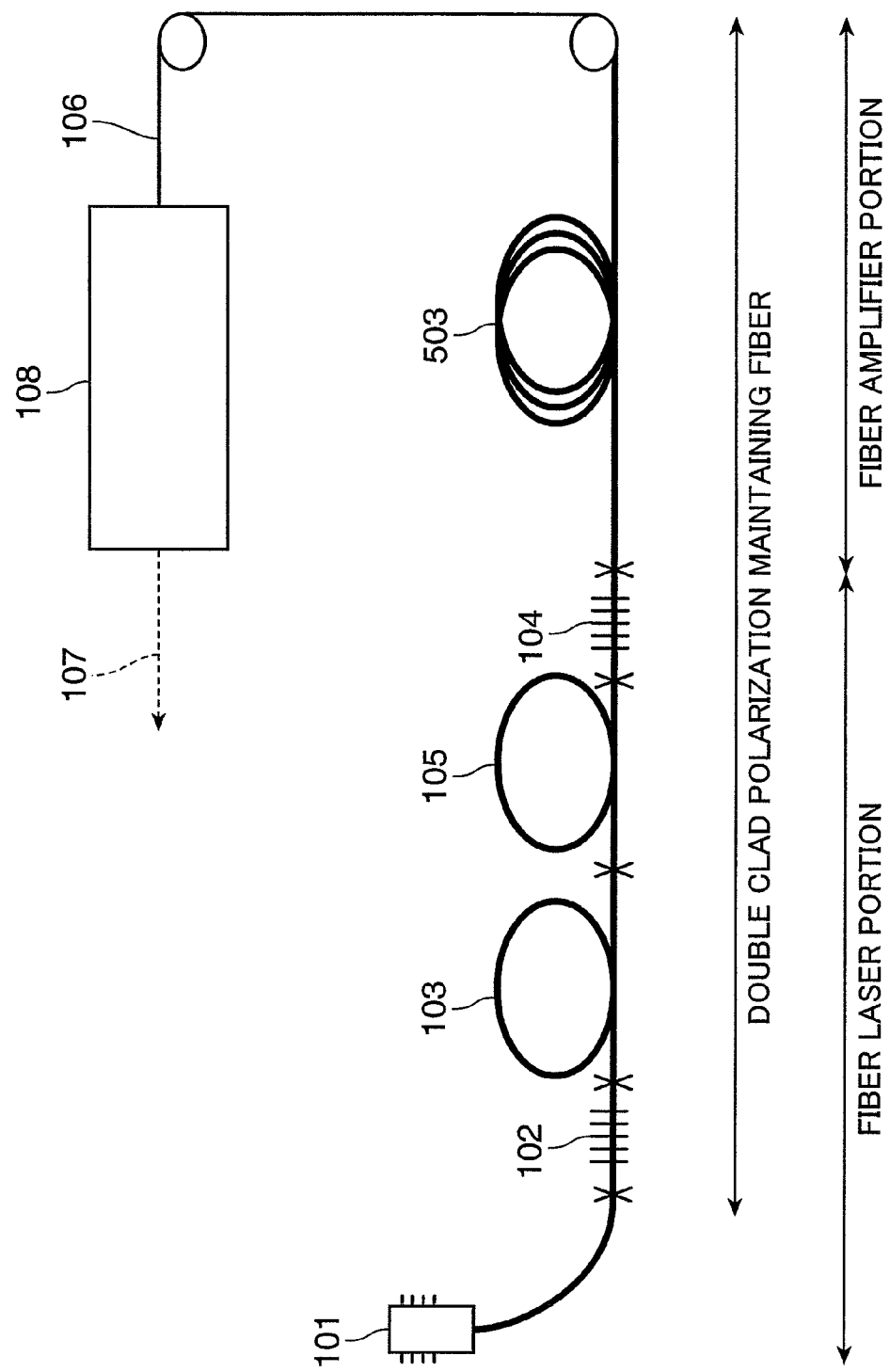

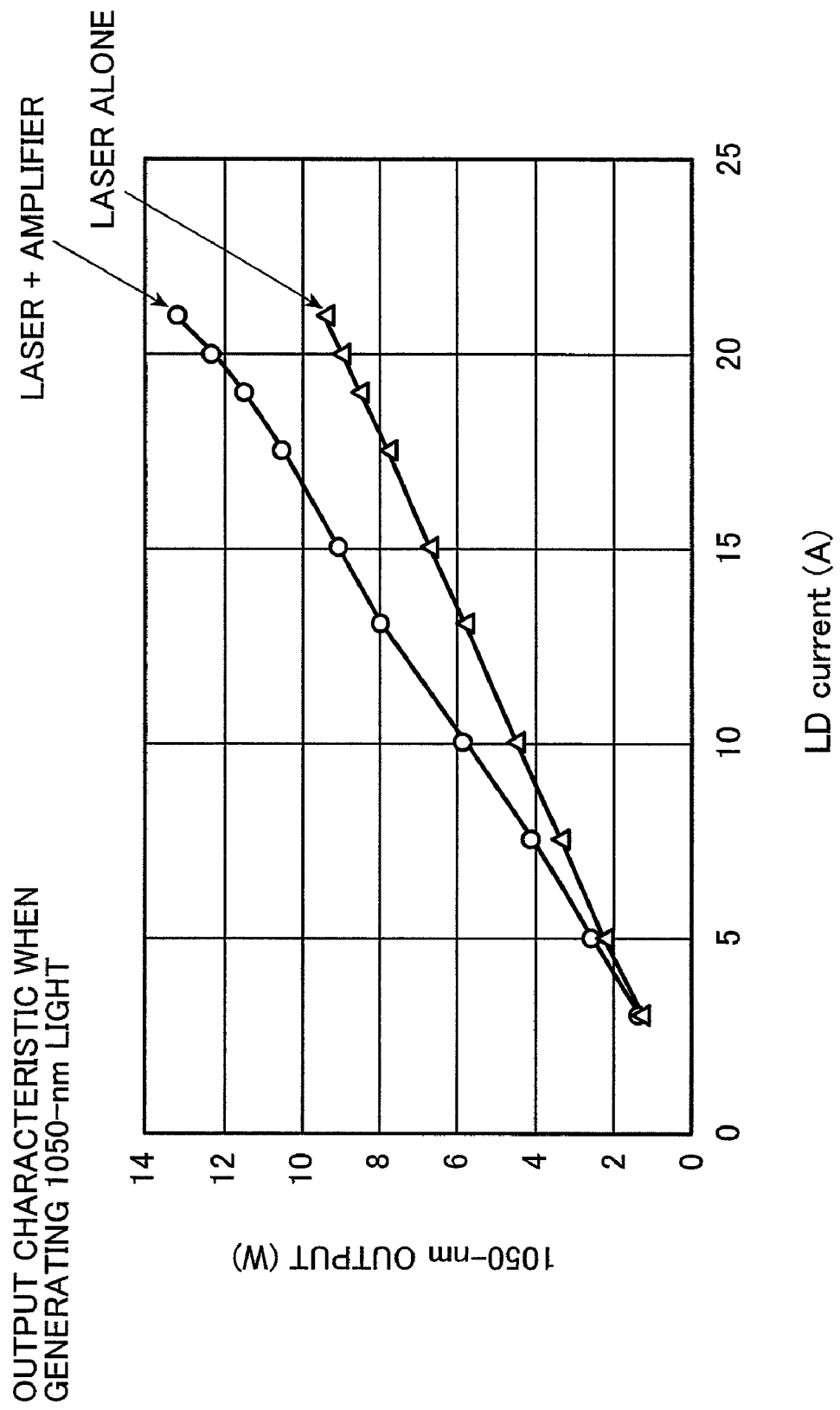

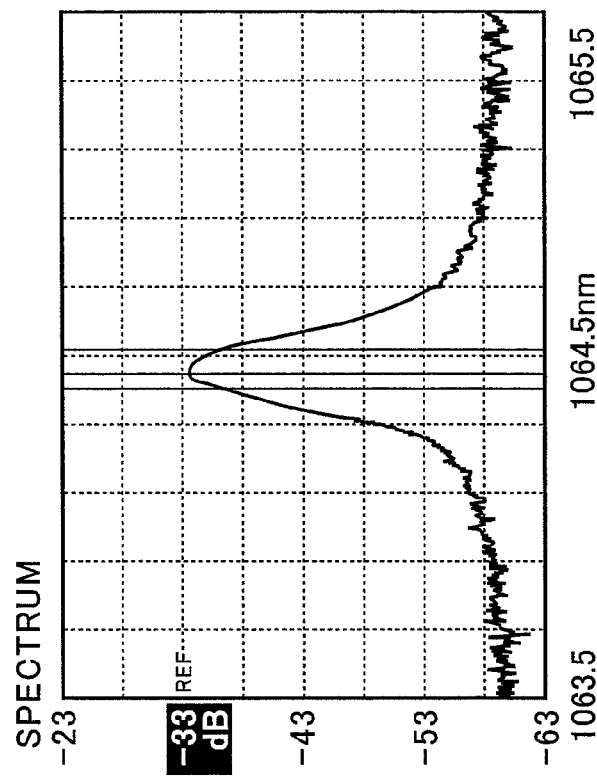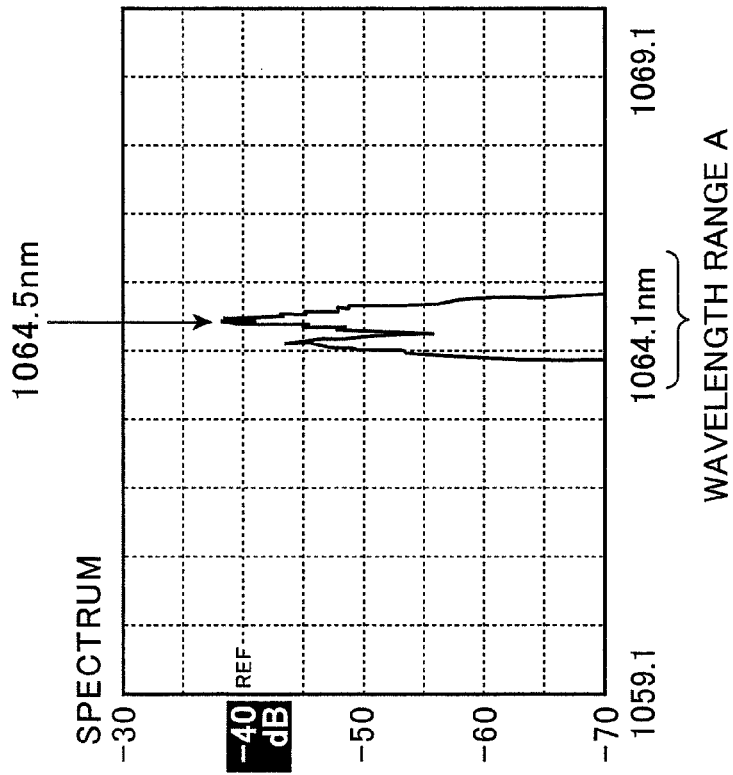

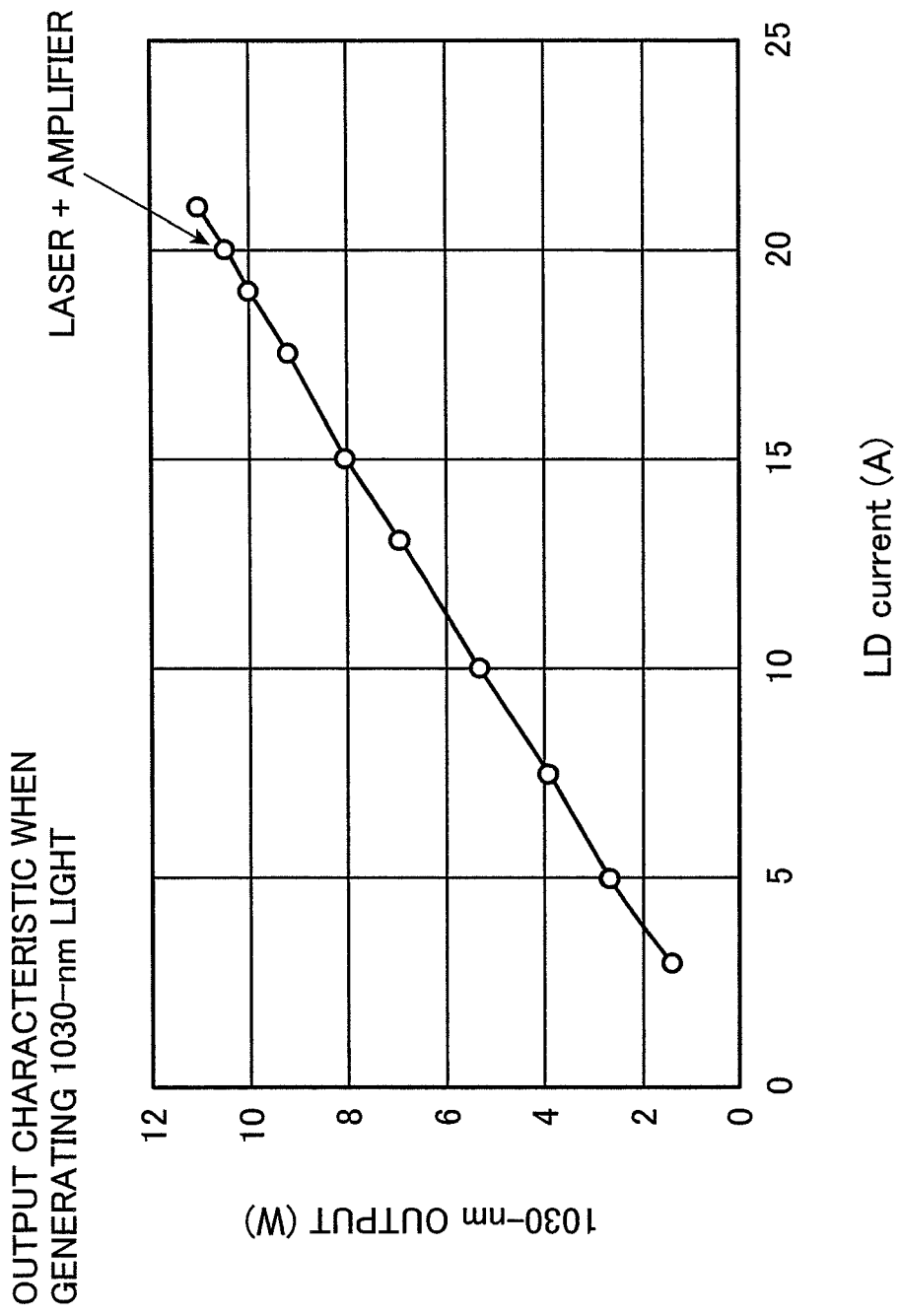

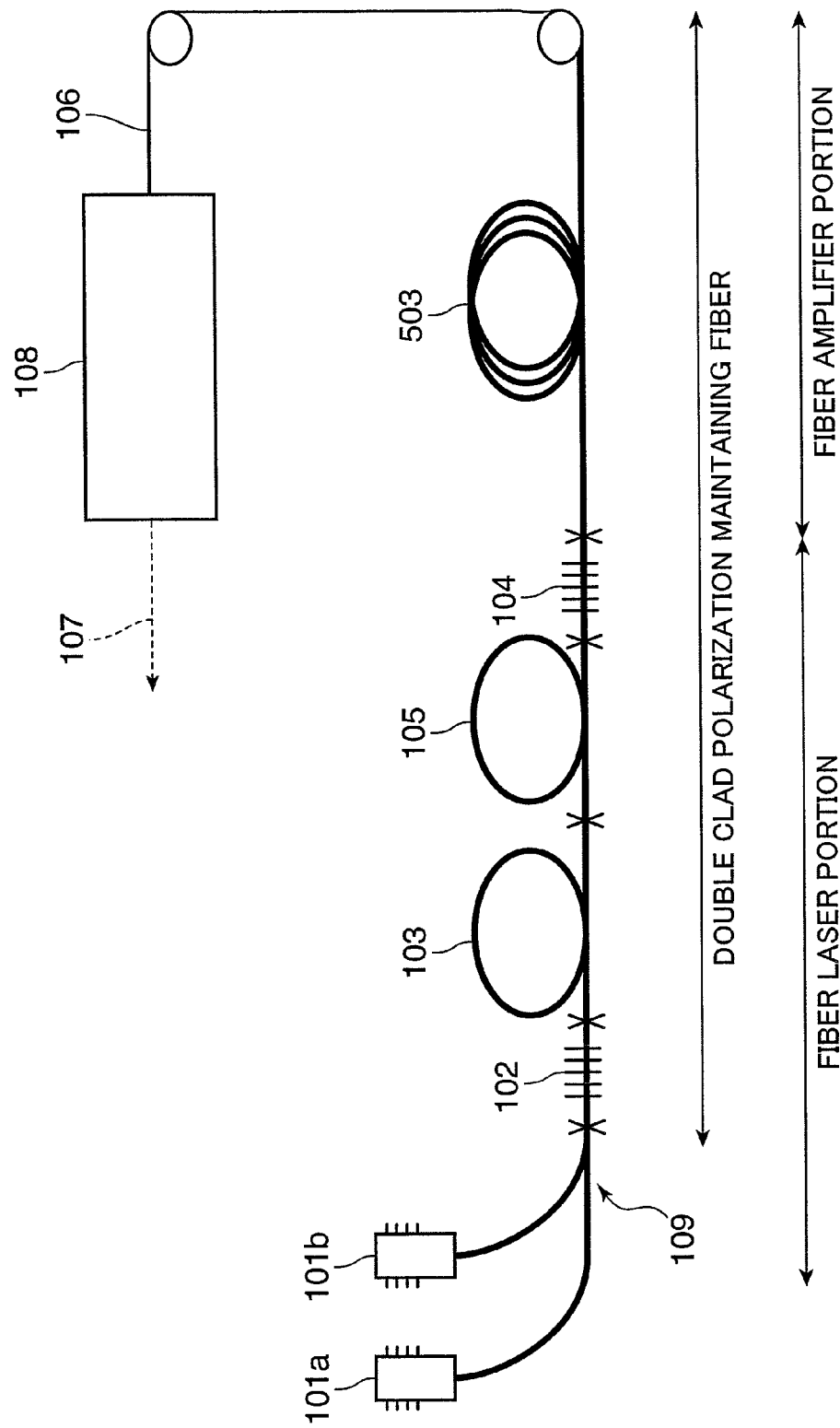

LASER LIGHT SOURCE DEVICE, IMAGE DISPLAY AND ILLUMINATOR

TECHNICAL FIELD

The present invention relates to a laser light source device formed by combining a fiber laser and a fiber amplifier and to an image display and an illuminator utilizing the laser light source device.

BACKGROUND ART

A fiber laser light source characterized by its high oscillation efficiency, excellent beam quality, capability of employing air cooling, and simple structure has been attracting attention recently as a near-infrared laser light source that replaces a solid-state laser light source that has been conventionally used.

FIG. 7 shows a schematic view showing the configuration of a typical fiber laser light source. Laser light emitted from a pump LD 101 goes incident on a rare-earth-doped clad pump fiber 103, which is a laser medium, and the laser light oscillates as it is resonated in a laser resonator formed of fiber gratings 102 and 104, which are reflection mirrors.

A polarizer 105 is interposed in order to align polarization directions of the oscillated laser light to a single direction.

The fiber laser light source has a satisfactory beam quality and is also capable of regulating the oscillation wavelength spectrum to a line width of the reflection spectrum in the fiber grating 104 on the exit side. The fiber laser light source is therefore extremely suitable as a fundamental light source for higher harmonic generation (referred to as a wavelength conversion light source) using non-linear optical crystal.

A second-harmonic generation (SHG) module 108 in FIG. 7 is a mechanism that generates second harmonics. With the use of this mechanism, a second harmonic 107 at twice the fundamental frequency is emitted in the end.

In addition, with the conventional solid-state laser, the oscillation wavelength of the laser is regulated by laser crystal being used. On the contrary, with the fiber laser, the oscillation wavelength is also regulated by a pair of the fiber gratings 102 and 104. Hence, although the gain varies with the wavelength, the fiber laser is characterized by the capability of changing the oscillation wavelength arbitrarily.

Meanwhile, a laser display is attracting attention as an application using such higher harmonics of laser light as the light source (wavelength conversion light source) (Non-Patent Document 1).

Because the occurrence of unwanted infrared rays and UV rays can be suppressed in comparison with a white lamp that has been used, power consumption can be reduced. Moreover, using a laser makes it possible to collect light efficiently, which can in turn enhance light utilization efficiency.

In addition, because the laser emits monochromatic light and therefore has high color purity in comparison with a case where a light emitting diode is used, it is possible to enhance the color reproducibility of the display. In particular, by setting the wavelength of green light to 520 to 535 nm, it is possible to express deeper green.

FIG. 13 shows a color reproduction range for each wavelength of green light used in a case where the wavelength of blue light is 460 nm and the wavelength of red light is 635 nm on the chromaticity diagram. Wavelengths that can be generated in the case of using a solid-state laser are only two wavelengths: 532 nm when a Nd:YAG or Nd:YVO$_4$ laser is used and 527 nm when a Nd:YLF laser is used. In particular, because YLF is fluoride crystal and is therefore difficult to manufacture, a fiber laser having a broad fluorescent spectrum (Non-Patent Document 2) and capable of choosing the oscillation wavelength without restriction has shown great promise.

As is described in Patent Document 1, because pumping light and oscillation light propagate on the same fiber in the fiber laser or the fiber amplifier, part of oscillated light becomes accidental return light and may possibly damage the pump light source. Such being the case, a method of avoidance to remove oscillation light using a lens system and a mirror has been discussed.

Regarding the configuration of a fiber amplifier that amplifies signal light (seed light) by inputting the signal light into a rare-earth-doped fiber together with pumping light, those disclosed in Patent Document 1 and Patent Document 2 are typical. It is also possible to amplify signal light generated in an oscillator using a fiber amplifier by combining the laser fiber and the fiber amplifier.

It is preferable for the green light source in the laser display to have a wavelength of 525 nm to 510 nm in terms of the color reproduction range. However, in a case where the wavelength conversion light source employing the fiber laser as the fundamental light source is used, the operation of the laser resonator (oscillation) becomes unstable because there is absorption of light at 1075 nm or shorter, which is the fundamental harmonic within the wavelength range specified above, in the rare-earth-doped fiber, which is a laser medium. This makes it impossible to extend the fiber length, which is an interaction length. This phenomenon becomes noticeable in a polarization maintaining fiber, such as a PANDA (Polarization-maintaining AND Absorption-reducing) fiber, used to obtain linearly polarized light that is essential in the case of the wavelength conversion light source.

Meanwhile, it is necessary to increase the pumping light in order to increase an output of laser light. However, depending on the wavelength of the pumping light, the pumping light that was not absorbed in the rare-earth-doped fiber, which is a laser medium, causes a problem that the fiber deteriorates. The mechanism of deterioration will be shown using FIG. 8.

FIG. 8 shows a fusion spliced portion 210 between a rare-earth-doped double clad polarization maintaining fiber and a typical single mode polarization maintaining fiber. The double clad polarization maintaining fiber is of a structure that allows light to propagate through an inner clad 203 while residual pumping light 208 is confined within an outer clad 202.

On the other hand, after it is connected to the single mode polarization maintaining fiber, air serves as the clad and the residual pumping light 208 is confined in a portion where a coating 207 is absent on the single mode polarization maintaining fiber. However, the pumping light leaks in a portion where the coating 207 is present. With this energy, the single mode polarization maintaining fiber partially generates heat (for example, heat generation portions 209) and thus deteriorates.

In this instance, assume that the pumping light is at power of 10 W, then an absorption amount of the double clad polarization maintaining fiber doped with Yb as a rare earth is 0.6 dB/m. Hence, 7.5 W of the pumping light is absorbed over the fiber length of 10 m. Accordingly, 2.5 W of light at 915 nm is irradiated as the residual pumping light and propagates through the clad of the single mode polarization maintaining fiber.

With the conventional configuration shown in FIG. 7, in a case where pumping is performed with 15 W of pumping light (915 nm) so that an output of oscillated light at 1064 nm is 6.8 W, the fusion spliced portion 110 and the primary coat (coating) on the single mode polarization maintaining fiber 112 overheat after 20 minutes since the continuous operation started and the fiber deteriorates.

FIG. 9 is a plot diagram showing the relation between the fiber length of an Yb-doped double clad fiber, which is a laser medium, and the residual pumping light with the power of the pumping light as a parameter. It is known from the examinations in the past that the fiber deteriorates when the residual pumping light exceeds 3.5 to 4 W. It is understood from FIG. 9 that it is necessary to make the pumping light smaller in a case where the fiber length has to be shortened due to an intrinsic loss of the fiber. More specifically, a possible output is naturally limited at the wavelength of 1050 nm or 1030 nm at which the loss in the fiber is significant.

In a case where light is oscillated at 1070 nm or longer, which is the wavelength at which oscillated light is not absorbed into the fiber, overheating of the fiber can be prevented by extending the rare-earth-doped double clad polarization maintaining fiber. However, at the wavelength, such as 1060 nm and 1050 nm, at which green can be produced through wavelength conversion, it is known that extending the length of the rare-earth-doped double clad polarization maintaining fiber makes a considerable loss resulting from fiber absorption, which raises problems that the oscillation becomes unstable and the light fails to oscillate at a desired wavelength. The intensity of pumping light to avoid overheating of the fiber is therefore determined naturally. Limitation is thus imposed on the maximum output.

FIG. 10 shows the absorption spectrum of the rare-earth-doped double clad fiber doped with about 1000 ppm of Yb as a rare earth, and a conventional example of the method for eliminating such a phenomenon will now be described.

A laser diode (LD) with the wavelength in the neighborhood of 915 nm or a laser diode with the wavelength in the neighborhood of 976 nm can be used as the pumping light. In this instance, an absorption amount of the fiber for 915-nm light is about 0.6 dB/m whereas an amount of the fiber for 976-nm light increases by three times to about 1.8 dB/m. Hence, using 976-nm light is thought to eliminate deterioration of the fiber.

However, the shape of the absorption peak is steep in the neighborhood of 976 nm and broad in the neighborhood of 915 nm. Accordingly, it is more stable to use a 915-nm band (900 to 950 nm) against a wavelength fluctuation of the pumping light caused by a temperature change of the pumping light LD or the like, and the cooling mechanism of the LD can be simplified. The device costs and power consumption can be consequently reduced. As has been described, it has been difficult to achieve the temperature stability of the fiber laser device and to obtain linearly polarized light at 1070 nm or shorter having power of 10 W or higher using the fiber laser at the same time.

Meanwhile, as a totally another technique, there is a technique known as a fiber amplifier that amplifies an output of signal light by inputting the signal light and pumping light into the rare-earth-doped double clad polarization maintaining fiber. FIG. 11 shows the configuration of this conventional technique.

Semiconductor laser light or a fiber laser of the single mode can be used as the signal light. FIG. 11 shows a case where a fiber laser is used as the signal light and a description will be given on the basis of this drawing.

As is shown in FIG. 11, a laser light source of this conventional example includes a fiber laser portion and a fiber amplifier portion.

The fiber laser portion is formed of a fiber laser pump LD (laser diode) 101 and a laser resonator. The laser resonator is formed of an Yb-doped clad pump fiber 103, a fiber grating 102, a fiber grating 104, and a polarizer 105. The Yb-doped clad pump fiber 103 and the fiber grating 102 are made of a double clad fiber and the fiber grating 104 and the polarizer 105 are made of a single mode fiber.

The fiber amplifier portion is formed of a fiber amplifier pump LD 501, an Yb-doped double clad fiber 503, and a pump combiner 502. The pump combiner 502 is made by integrating a single mode fiber 504 to input signal light with a multi-mode fiber 505 to input pumping light. The fiber amplifier portion is made of a double clad fiber.

Signal light generated in the fiber laser portion is amplified in the fiber amplifier portion in the latter stage.

In the configuration of this conventional example, however, not only is it necessary to prepare the fiber laser pump laser diode 101 and the fiber amplifier pump laser diode 501 separately, but it is also necessary to prepare the pump combiner 502 formed by integrating the single mode fiber 504 with the multi-mode fiber 505. The material costs are increased because of these two factors.

Moreover, because points at which the fiber is fusion spliced are increased, there is a drawback that the device becomes less reliable.

In addition, depending on the oscillation wavelength, signal light that can be generated in the fiber laser portion fails to achieve satisfactory intensity. This raises a need to adopt a multi-stage configuration by connecting more than one fiber amplifier portion in series, and thereby poses a problem that the material costs are increased.

Further, the optimal fiber length of the Yb-doped fiber varies with the wavelength. The fiber length of the Yb-doped fiber is determined so that light-to-light conversion efficiency, which is found by dividing the output of generated light by input power of the pumping light inputted, reaches the maximum.

FIG. 12 shows the relation between the fiber length and the light-to-light conversion in a case where a polarization maintaining fiber is used at the generation wavelength of 1064 nm. In this case, the optimal fiber length is 17 to 18 m. The optimal value actually varies slightly due to a fusion loss or the like. However, it can take the maximal value of the conversion efficiency by varying the fiber length. The fiber length at which the light-to-light conversion takes the maximal value tends to become shorter as the oscillation wavelength becomes shorter. Hence, the pumping light has to be decreased as the oscillation wavelength becomes shorter, which makes it difficult to achieve a high output. This tendency is noticeable with the polarization maintaining fiber and the fiber length is about half the Yb-doped fiber length used in a single mode fiber for normal random polarization.

As has been described, the fiber laser and the fiber amplifier of the conventional configuration in FIG. 11 is available for laboratory use but is not readily applied to industrial and commercial use.

Patent Document 1: Japanese Patent No. 3012034
Patent Document 2: JP-A-2-43782
Non-Patent Document 1: *Japanese Journal of Applied Physics*, Vol. 43, No. 8B, 2004, pp.5904-5906
Non-Patent Document 2: *Rare-earth-doped Fiber lasers and amplifiers*, (Marcel Dekker, Inc. 2001), p.145, FIG. 10

DISCLOSURE OF THE INVENTION

An object of the invention is to provide a laser light source device having high reliability against fiber deterioration caused by residual pumping light and capable of increasing an output of oscillation light.

A laser light source device according to one aspect of the invention includes: a fiber laser portion having a first double clad fiber doped with a rare earth as a laser active substance, a second double clad fiber in which is formed a pair of fiber gratings to determine an oscillation wavelength of the first double clad fiber, and a laser light source emitting pumping light to the first double clad fiber to pump the first double clad fiber; a fiber amplifier portion formed of a double clad fiber doped with a rare earth as a laser active substance and amplifying oscillation light of the fiber laser portion; and a wavelength conversion module converting the oscillation light amplified by the fiber amplifier portion to higher harmonics. The fiber laser portion pumps the fiber amplifier portion by emitting to the fiber amplifier portion the pumping light remaining in the first double clad fiber on which the pumping light of the laser light source has been incident.

In the laser light source device described above, because the residual pumping light in the fiber laser portion is used as the pump light source in the fiber amplifier portion, it is possible to prevent deterioration of the fiber that raises a problem when generating light at a high output. Further, the output can be enhanced further without having to additionally provide a pump light source for the fiber amplifier portion. It is thus possible to obtain a sufficient output as the light source applied to an image display using a laser. Accordingly, an image display using this light source is capable of widening the color reproduction range in comparison with a conventional solid-state laser.

Further, laser light in a 915-nm band in which the absorption spectrum of the rare-earth fiber is broad can be used as pumping light in the fiber laser portion. Accordingly, the need to accurately control the temperature of the pump laser is eliminated and a Peltier element can be omitted. Power consumption can be therefore reduced.

BRIEF DESCRIPTION OF THE DRAWINGS

FIG. 1 is a schematic view showing the configuration of a laser light source device according to a first embodiment of the invention.

FIG. 2 is a plot diagram showing the output characteristic of 1050-nm light of the laser light source device according to the first embodiment of the invention.

FIG. 3A is a view showing the spectrum of light generated in the laser light source device according to the first embodiment of the invention (a polarizer is absent), and FIG. 3B is a view showing the spectrum of light generated in the laser light source device according to the first embodiment of the invention (after the polarizer is interposed).

FIG. 4 is a plot diagram showing the output characteristic of 1030-nm light of a laser light source device according to a second embodiment of the invention.

FIG. 14 is a schematic view showing the configuration of the laser light source device of the invention in which two pump LDs are applied in the fiber laser portion.

BEST MODE FOR CARRYING OUT THE INVENTION

Figure 5:
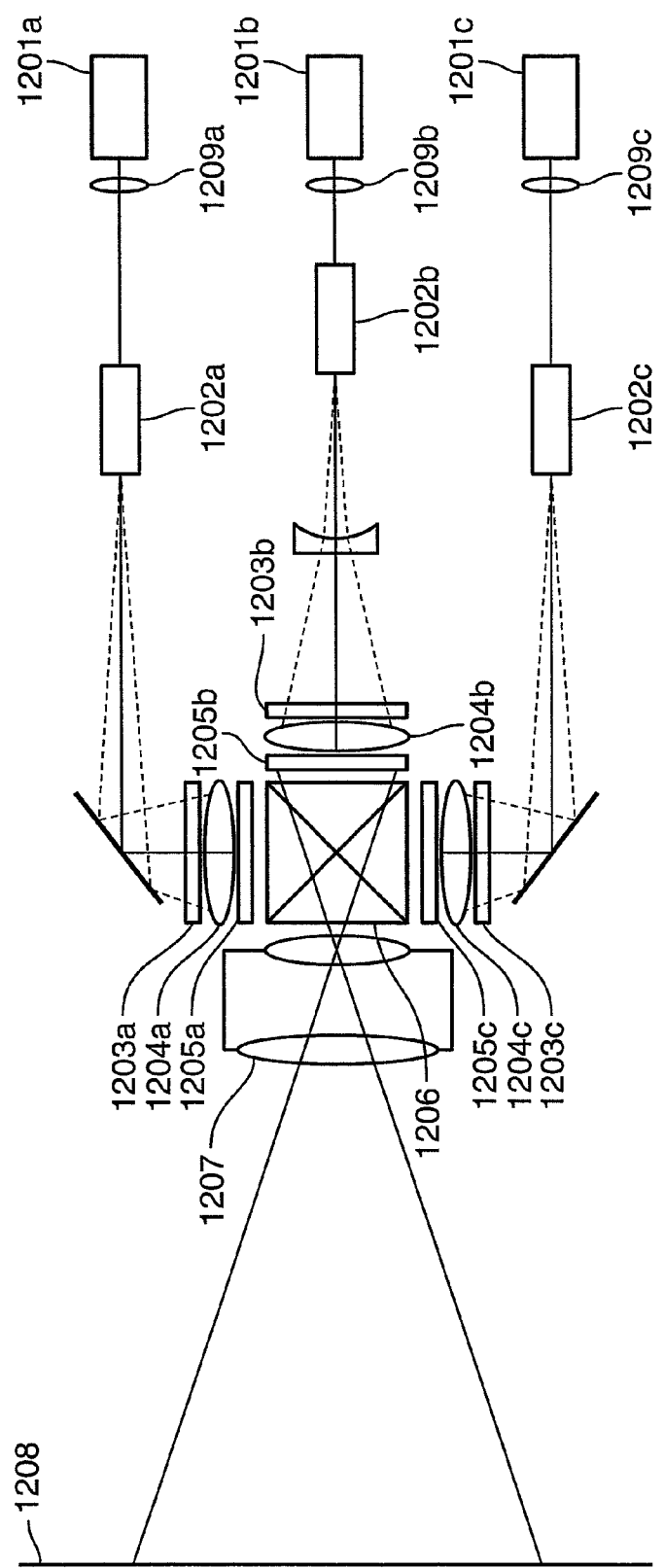
FIG. 5 is a schematic view showing an example of an image display using the laser light source device of the invention.

Hereinafter, embodiments of the invention will be described with reference to the drawings. Like components are labeled with like reference numerals and a description of those labeled with the same reference numerals in the drawing may be omitted where appropriate.

First Embodiment

A first embodiment of the invention is a case where a fiber laser and a fiber amplifier both using a polarization maintaining fiber are combined.

FIG. 1 shows the configuration of a laser light source device according to the first embodiment of the invention. Referring to FIG. 1, the laser light source device of this embodiment includes a fiber laser portion and a fiber amplifier portion. The fiber laser portion includes a pump LD 101, a fiber grating 102, an Yb-doped double clad polarization maintaining fiber 103, a fiber grating 104, and a polarizer 105. The fiber amplifier portion includes an Yb-doped double clad polarization maintaining fiber 503. Both the fiber laser portion and the fiber amplifier portion are made of a double clad polarization maintaining fiber. Signal light generated in the fiber laser portion is amplified in the fiber amplifier portion. The laser light source device of this embodiment is connected to a second-harmonic generation (SHG) module 108 via an oscillation light propagation fiber 106.

In the fiber laser portion, the double clad polarization maintaining fiber 103 (the fiber length is 10 m in the case of this embodiment) doped with Yb as a rare earth in the core portion thereof is pumped by the pump LD 101 and laser light is oscillated in a resonator formed of a pair of the fiber gratings 102 and 104.

In the case of this embodiment, a single emitter laser diode (maximum output is 12 W) with the oscillation wavelength of 915 nm is used as the pump LD 101.

In the fiber grating 102, a grating is formed after sensitivity to UV light is enhanced by adding germanium in the core portion of the double clad polarization maintaining fiber. Characteristics of the fiber grating 102 are that the center wavelength is 1050 nm, the reflection spectrum half value width is 1 nm, and the reflection ratio is 98%.

Likewise, the fiber grating 104 is formed of a double clad polarization maintaining fiber (the core diameter is 6 μm and the clad outside diameter is 125 μm) also doped with germanium in the core portion thereof, and the one used herein has the center wavelength of 1050.1 nm, the reflection spectrum half value width of 0.09 nm, and the reflection ratio of 10%.

In the laser light source device of this embodiment, by manufacturing the fiber grating 104 having the conditions specified above by way of example in the double clad polarization maintaining fiber, it is possible to use the residual pumping light as the pump source of the fiber amplifier portion in the latter stage. Hereinafter, a description will be given in this point.

Conventionally, the residual pumping light causes fiber deterioration that becomes a problem when generating light at a high output for a display or the like.

Accordingly, an attempt was made to increase an absorption amount of the residual pumping light by extending the length of the rare-earth-doped double clad polarization maintaining fiber by increasing the reflection ratio of the fiber grating 104. There is, however, a limit to the improvement of the characteristics and this attempt cannot be deemed as an effective measure.

In addition, it is important to narrow the band when used for the wavelength conversion. However, increasing the reflection ratio of the fiber grating 104 raises another problem rather than a resolution that it becomes difficult to narrow the band of the fiber grating 104.

Under these circumstances, the laser light source device of this embodiment is capable of preventing the fiber deterioration described above by using the residual pumping light in the fiber laser portion as the pump light source in the fiber amplifier portion.

Further, in the laser light source device of this embodiment, by using the residual pumping light in the fiber laser portion as the pump light source in the fiber amplifier portion, it is possible to eliminate the need for the pump light source in the fiber amplifier portion, which can in turn reduce the manufacturing costs.

The oscillation light is introduced into the SHG module 108 by the oscillation light propagation fiber 106 through which is propagated the oscillated light in the neighborhood of 1050 nm, and light at 525 nm is generated through the second harmonic generation.

The effect of preventing fiber deterioration in the laser light source device of this embodiment will now be described more in detail.

Figure 7:
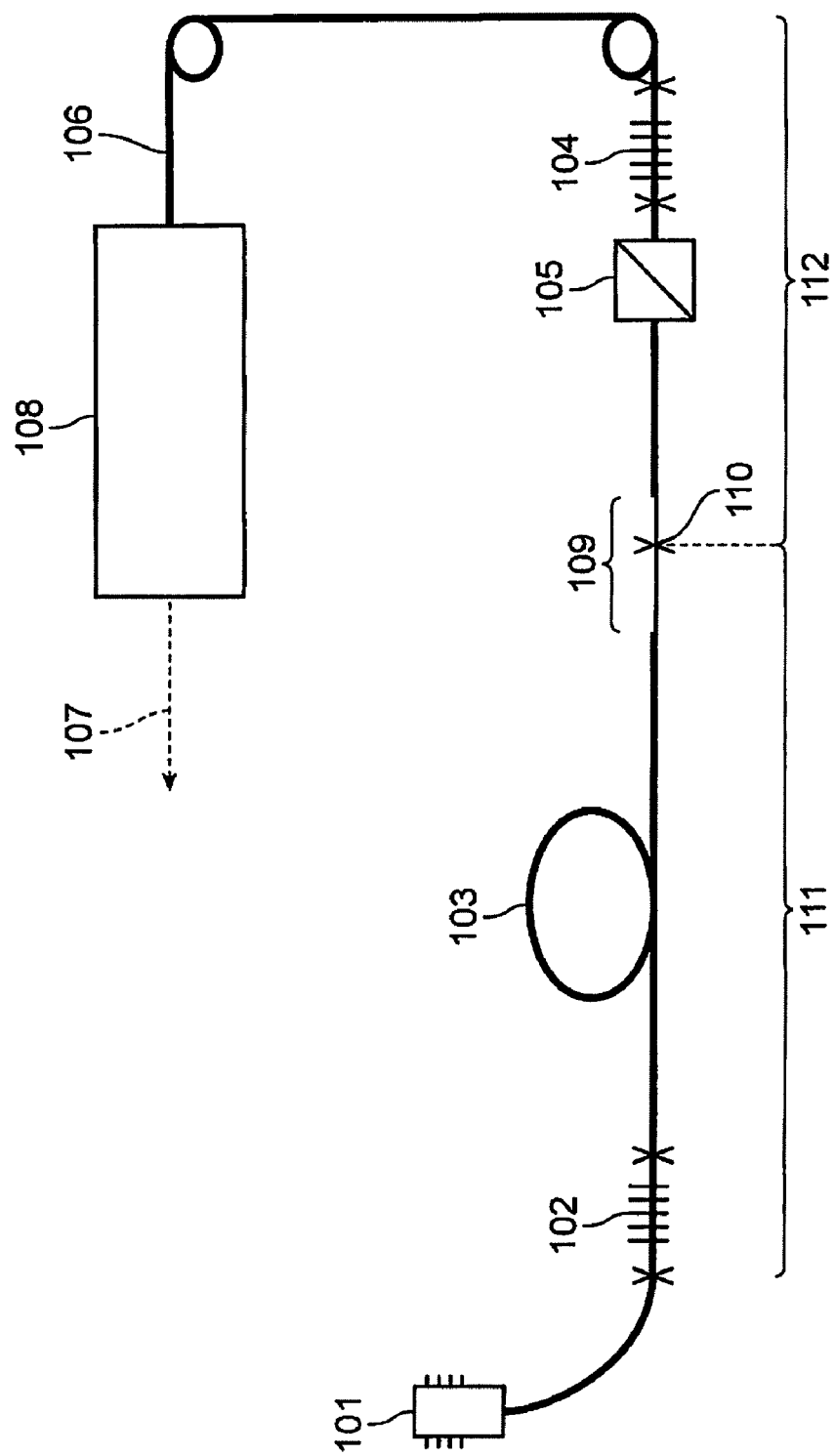
FIG. 7 is a view schematically showing the configuration of a fiber laser light source combined with a conventional second harmonic generator.
Figure 8:
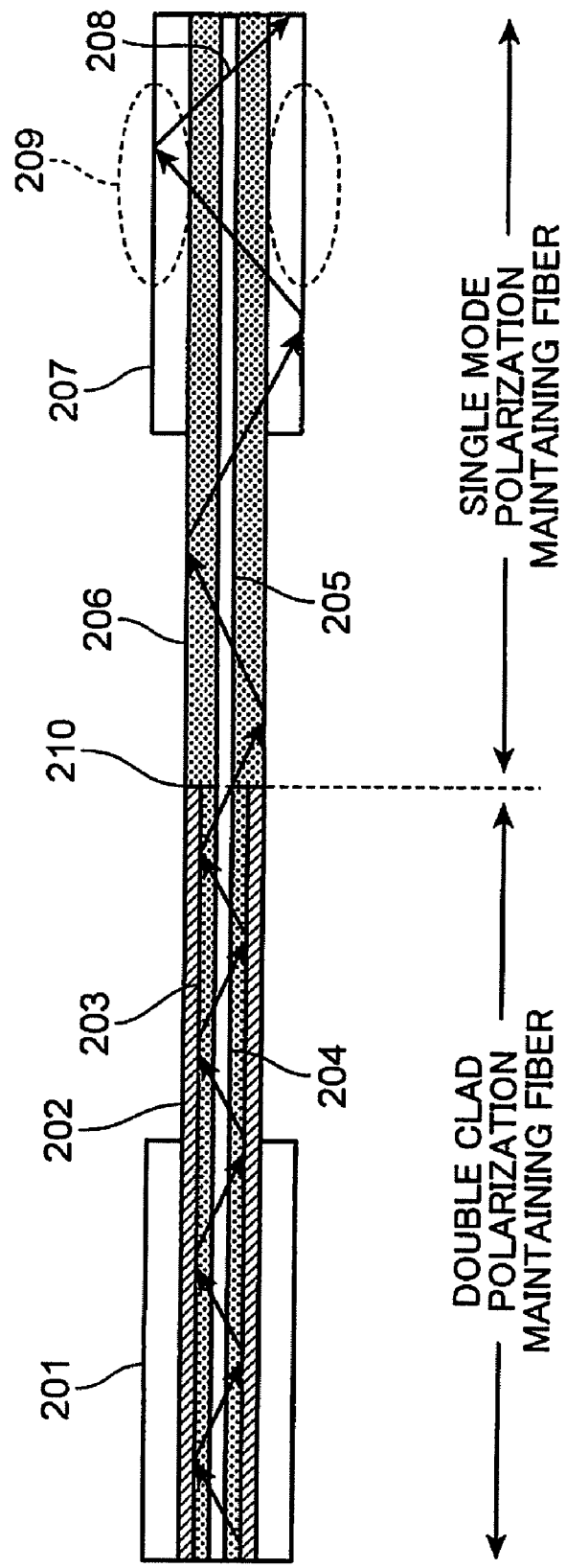
FIG. 8 is a schematic view of a connection portion between a double clad polarization maintaining fiber and a single mode polarization maintaining fiber.

In the case of the conventional configuration of FIG. 7, the connection portion 110 connecting the rare-earth-doped double clad polarization maintaining fiber 111 and the typical single mode polarization maintaining fiber 112 is present between the Yb-doped clad pump fiber 103 and the polarizer 105. This configuration causes deterioration of the connection portion 110 and the single mode polarization maintaining fiber 112.

On the contrary, in the laser light source device of this embodiment, a portion of the single mode polarization maintaining fiber that is not a double clad is eliminated and both the fiber laser portion and the fiber amplifier portion are made of a double clad polarization maintaining fiber. It is thus possible to use the fundamental harmonic (wavelength is 915 nm) remaining in the fiber laser portion as the pumping light in the fiber amplifier portion in the latter stage.

In this instance, assume that the pumping light is at power of 30 W, then an absorption amount of the pumping light is 0.6 dB/m with the fiber used herein (PM-YDF 5/130 available from nufern Inc.), which is a double clad polarization maintaining fiber doped with Yb as a rare earth. Accordingly, 22.5 W of the pumping light is absorbed over the fiber length of 10 m and 7.5 W of light at 915 nm is irradiated as the residual pumping light so as to propagate through the single mode clad. With the conventional configuration shown in FIG. 7, in a case where the pumping is performed with the pumping light (915 nm) at the power of 20 W and an output of oscillation light at 1050 nm is 9 W, the connection portion 110 and the primary coat (coating) on the single mode polarization maintaining fiber 112 overheats after 20 minutes since the continuous operation started and the fiber deteriorates.

On the contrary, the coating does not overheat even when the laser light source device of this embodiment is operated continuously for 20 hours or more. It is therefore understood that the reliability and the output can be enhanced.

Moreover, because the pumping light at larger power can be pumped and the output can be amplified, not only is it possible to increase an output at 1050 nm, but it is also possible to increase an output of green light as a result of wavelength conversion from this output.

In addition, in the conventional configuration in FIG. 7, when the fiber laser portion stops while the fiber amplifier portion is pumped, abnormal oscillation occurs in the fiber amplifier portion, and there is a risk that the fiber laser portion is broken by this abnormal oscillation. On the contrary, the laser light source device of this embodiment adopts the configuration in which the Yb-doped clad fiber 103 in the fiber laser portion is pumped by the pump LD 101 and the Yb-doped clad fiber 503 in the fiber amplifier portion is pumped by the residual pumping light. Hence, there occurs no phenomenon that the fiber amplifier portion alone is pumped. It is thus possible to prevent breaking of the fiber laser portion by abnormal oscillation in the fiber amplifier described above.

The SHG module 108 that outputs green light through wavelength conversion of output light from the laser light source device of this embodiment will now be described. The configuration of the SHG module 108 in a case where an Yb-doped fiber laser having the oscillation wavelength of 1050 nm is used as the fundamental harmonic light source will be described.

In the SHG module 108, when infrared light (parallel beams: beam diameter is 760 μm) is emitted from the laser light source device of this embodiment through the oscillation light propagation fiber 106, it is collected into a wavelength conversion element by a collective lens (f=30 mm). In this instance, a MgO-doped lithium niobate element provided with a periodic polarization inverting structure is used as the wavelength conversion element. The polarization inverting period of the wavelength conversion element in this instance is 6.69 μm. The polarization inverting element is fixed to a metal plate and the temperature thereof is controlled at about 25° C. by a Peltier element.

Green light at 525 nm can be obtained by separating the second harmonic (green light) generated from the polarization inverting element to the fundamental harmonic ($\omega$) and the second harmonic ($2\omega$) using a wavelength separation filter. The periodic polarization inverting MgO-doped lithium niobate element is used herein because it has a large effective non-linear optical constant of about 15 pm/V and large wavelength conversion efficiency from infrared light to green light. Beside this element, lithium tantalate, MgO-doped lithium tantalite, potassium titanyl phosphate (KTP: $KTiPO_4$), and so forth are available as well. Borate-based crystal, such as lithium tetraborate, is also available. However, the environment has to be controlled strictly because it has a small effective non-linear optical constant and many have a property of reacting with the moisture in air.

FIG. 2 shows output characteristics of output light having a wavelength of 1050 nm from the laser light source device of this embodiment. In the configuration of this embodiment, the fiber length of the Yb-doped fiber 103 in the fiber laser portion is set to 18 m and the fiber length of the Yb-doped fiber 503 in the fiber amplifier portion is set to 20 m. Output characteristics are plotted in each of a case where the fiber amplifier portion is connected as the configuration of this embodiment (the graph indicated by laser+amplifier in FIG. 2) and a case where the fiber amplifier portion is omitted from the configuration of this embodiment (the graph indicated by laser alone in FIG. 2).

In the laser light source device of this embodiment, the residual pumping light in the fiber laser portion can be utilized as the pumping light in the fiber amplifier portion. Hence, as is shown in FIG. 2, it is possible to enhance the output without being affected by the fiber length and the oscillation wavelength.

In addition, the laser light source device of this embodiment is formed by combining the fiber laser portion and the fiber amplifier portion both using a polarization maintaining fiber. However, as is shown in FIG. 1, by interposing the polarizer (polarization portion) 105, it is possible to make oscillation light outputted in the form of polarized light in the slow axis direction and in the form of polarized light in the fast axis direction of the polarization maintaining fiber into single polarized light.

The polarizer 105 is formed by making the double clad polarization maintaining fiber in the shape of a coil. When formed in this manner, it is possible to propagate the residual pumping light to the fiber amplifier portion without reducing the power of the residual pumping light in the fiber laser portion.

For example, a fiber having a cutoff wavelength of 980 nm or 850 nm can be used as the double clad polarization maintaining fiber from which the polarizer 105 is formed.

In a case where the cutoff wavelength of the fiber is 980 nm, it is sufficient to form the fiber in the shape of a coil having the core diameter of 5.5 to 6.5 μm and the diameter of 30 mm or smaller. Further, it is preferable to set the diameter to 20 to 30 mm (set the radius to 10 to 15 mm) because the fiber deterioration may possibly occur when the diameter is 15 mm or smaller.

In a case where the cutoff wavelength is 850 nm, it is sufficient to form the fiber in the shape of a coil having the core diameter of 5.5 to 6.5 μm and the diameter of 90 mm or smaller. Further, it is preferable to set the diameter to 20 to 90 mm (set the radius to 10 to 45 mm) because the fiber deterioration may possibly occur when the diameter is 15 mm or smaller. It is more preferable to set the diameter to 20 to 35 mm by taking a variance of the characteristics of the fiber into account.

Another configuration of the polarizer 105 may use doubly refracting crystal or a polarization beam combiner as one type of optical component. Both use a double clad polarization maintaining fiber as a fiber into and from which the oscillation light and the pumping light are inputted and outputted. When configured in this manner, it is possible to provide the single peak to the wavelength spectrum, which can in turn enhance the wavelength conversion efficiency in the SHG module. In particular, the polarization beam combiner is more preferable because it is formed of the double clad polarization maintaining fiber and thereby capable of reducing a transmission loss of the pumping light in comparison with the case of using a polarizer using the doubly refracting crystal.

FIG. 3A and FIG. 3B show the wavelength spectra, respectively, before and after single polarized light is made by the polarizer 105. FIG. 3A shows the wavelength spectrum before the polarizer 105 is inserted and FIG. 3B is a view showing the wavelength spectrum after the polarizer 105 is inserted.

As are shown in FIG. 3A and FIG. 3B, there are two peaks in the wavelength spectrum before the polarizer 105 is inserted and the peaks are reduced to one on the slow axis side after the polarizer is inserted. The spectrum of FIG. 3B is the plot in the wavelength range in a wavelength range A in the spectrum of FIG. 3A.

Figure 9:
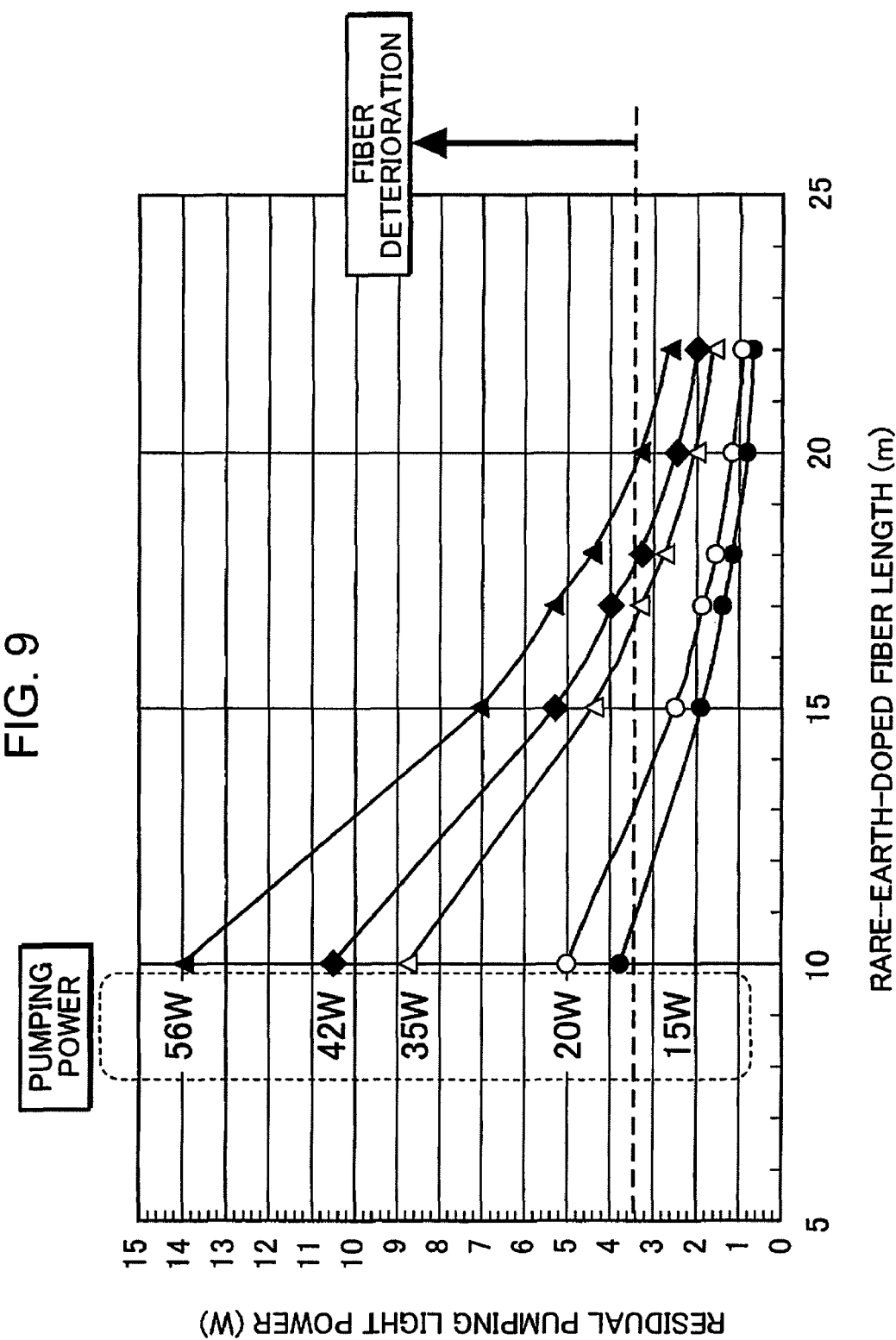
FIG. 9 is a view showing the relation between an Yb-doped fiber length and residual pumping light with pumping light power as a parameter.
Figure 10:
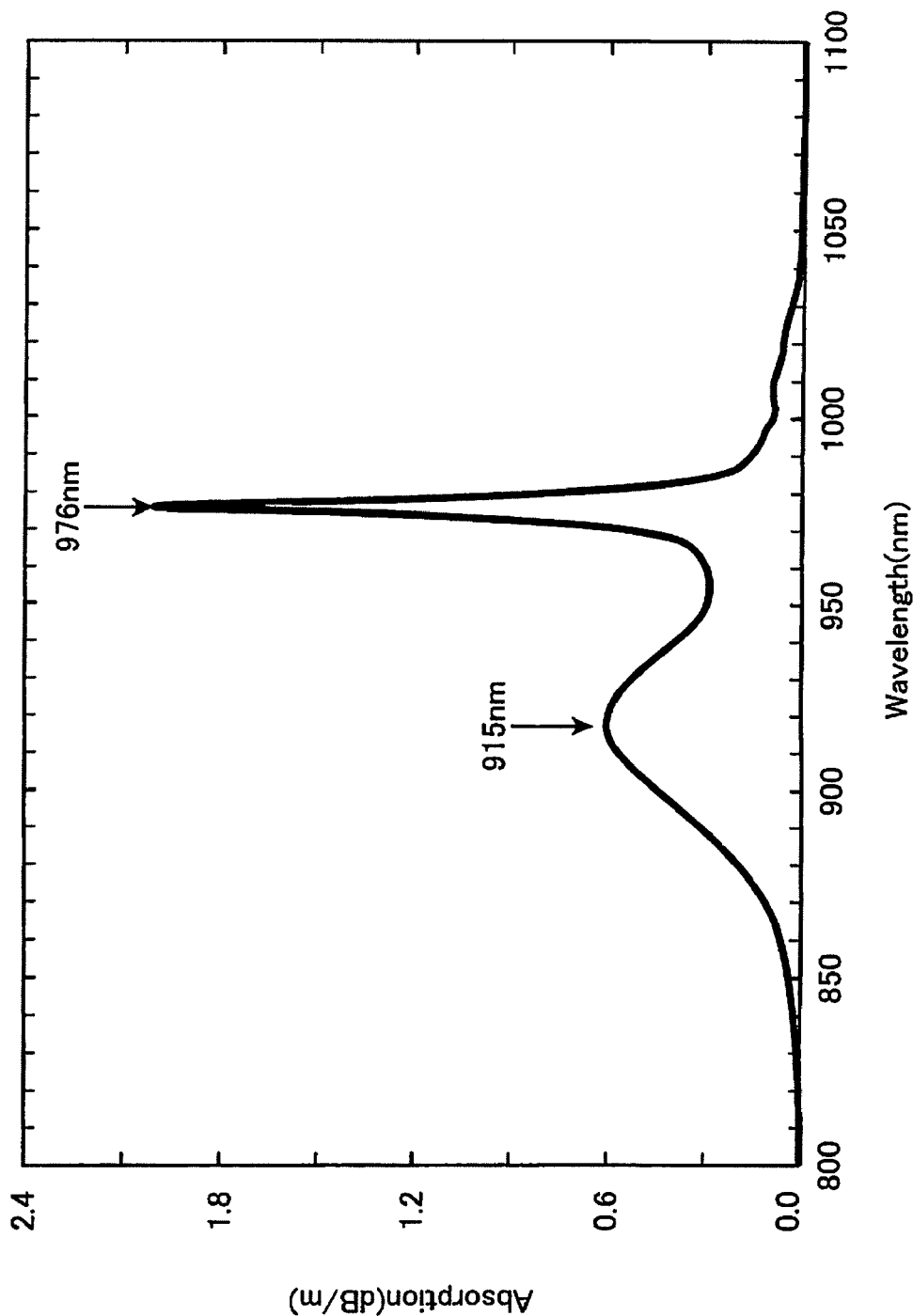
FIG. 10 is a plot diagram showing the absorption spectrum of an Yb-doped double clad fiber.
Figure 11:
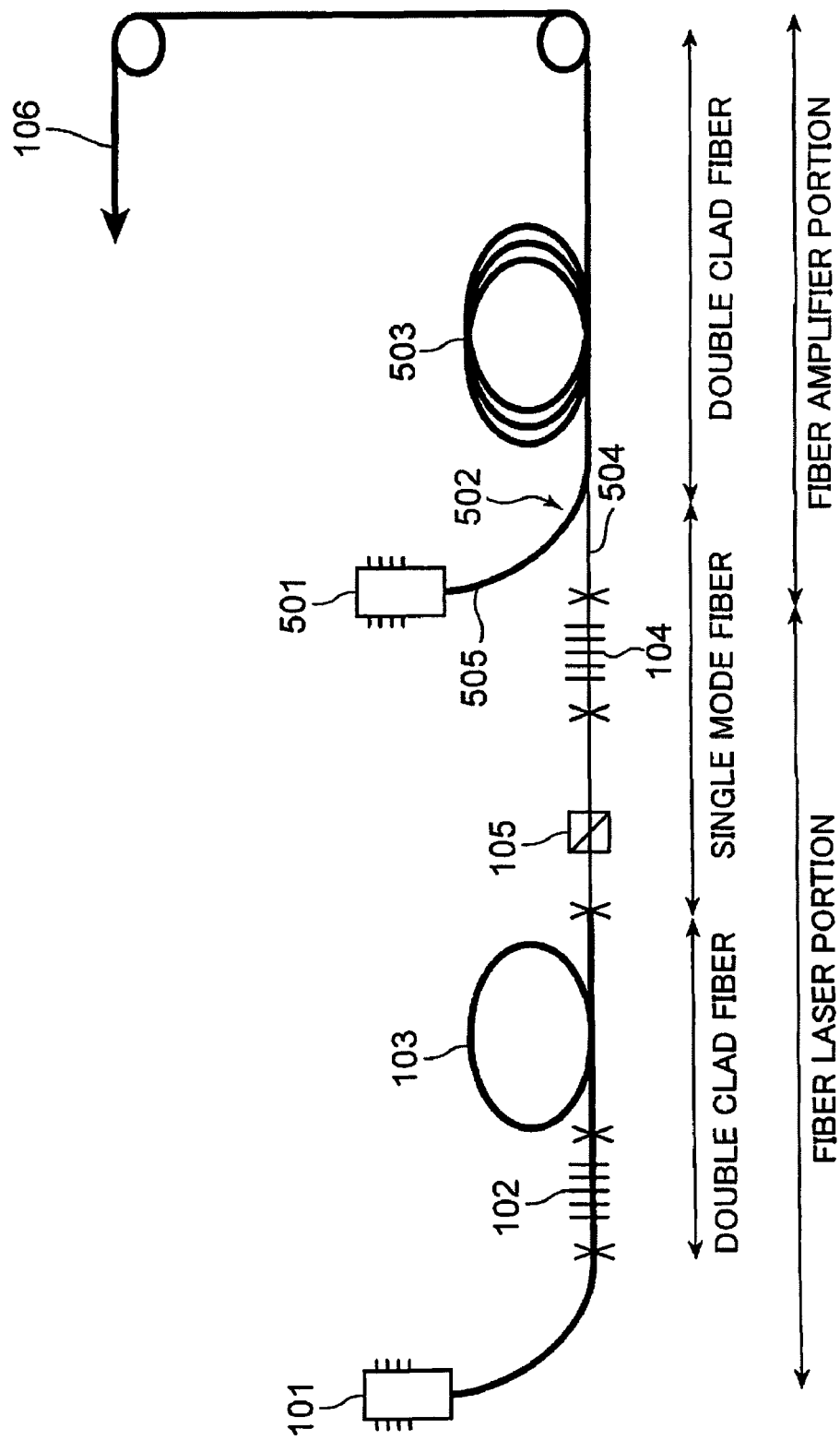
FIG. 11 is a view schematically showing the configuration of a conventional example of a laser light source formed by combining a fiber laser and a fiber amplifier.
Figure 12:
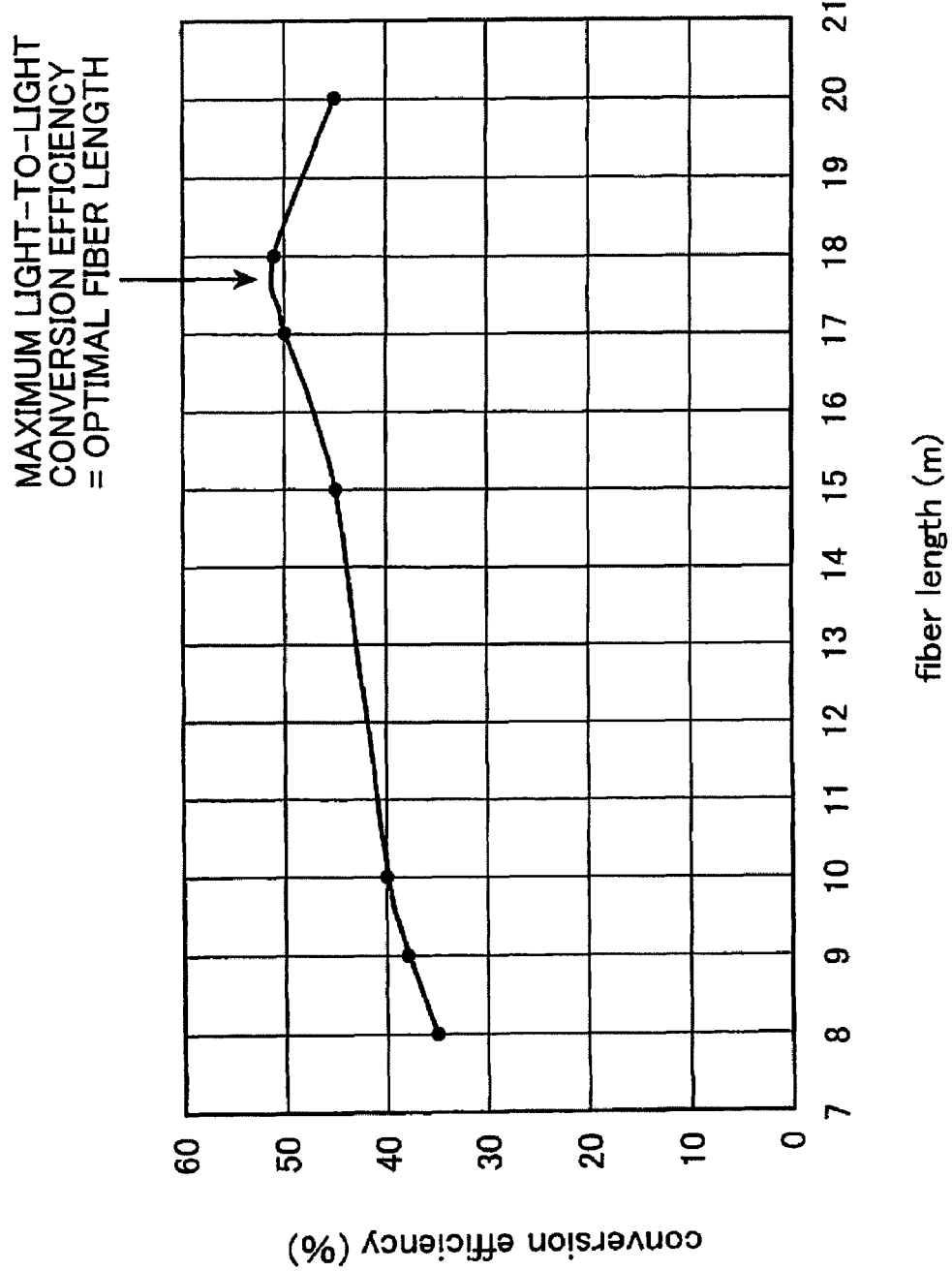
FIG. 12 is a plot diagram showing the relation between the Yb-doped fiber length and light-to-light conversion efficiency (at generation of 1064-nm light).

The laser light source device of this embodiment is suitable as a green light source in a laser display or the like that requires light at a high output. For example, in a case where 3 W of green light is to be generated, given that 1070 nm is the oscillation wavelength from the lager light source device, then the required pumping light power is 20 W. The wavelength of the green light to be generated is thus found to be 535 nm. The fiber length required in this instance is 15 m. As is shown in FIG. 9, the power exceeds the level of fiber deterioration in a case where further more green light is to be obtained. It is thus possible to prevent fiber deterioration by applying the laser light source device of this embodiment.

In a case where the oscillation wavelength from the laser light source device is 1030 nm, the pumping light power of 25 W is required and green light having a wavelength at 515 nm is generated. The fiber length required in this instance is 10 m. In this case, as is shown in FIG. 9, the power exceeds the level of fiber deterioration. Hence, it is necessary to prevent fiber deterioration by applying the laser light source device of this embodiment.

In a case where the oscillation wavelength is 1050 nm, the fiber length required is 12 m and green light at a level of 1 W exceeds the level of fiber deterioration. In a case where the oscillation wavelength is 1060 nm, the fiber length required is 14 m and green light at a level of 2 W exceeds the level of fiber deterioration. It is therefore essential to apply the laser light source device of this embodiment.

Second Embodiment

As a second embodiment of the invention, the configuration to generate light at 515 nm through the second harmonic generation from the fundamental harmonic at 1030 nm will be described. It is possible to replace a high output Ar ion laser with a laser light source device of this embodiment.

A difference of the laser light source device of this embodiment from the laser light source device of the first embodiment above is the length of the Yb-doped fiber 103 used in the fiber laser portion in FIG. 1. Hereinafter, the difference will be described. The laser light source device of this embodiment can be achieved by the same configuration as that of the laser light source device of the first embodiment above except for the length of the Yb-doped fiber 103.

When generating light at 1030 nm, the wavelength cannot be selected in the fiber grating 104 when the fiber length exceeds 3 m, and the oscillation wavelength becomes unstable. This is because a loss in the Yb-doped fiber for the oscillated 1030-nm light becomes larger.

In the laser light source device of this embodiment, in order to avoid instability of the oscillation wavelength, the fiber length of the Yb-doped fiber 103 in the fiber laser portion is set to about 2.5 to 3 m and the fiber length of the Yb-doped fiber 503 in the fiber amplifier portion in the latter stage is set to 30 m. In addition, the wavelength of the pump LD 101 in the pump light source used herein is 915 nm.

In order to generate 1030-nm light with the conventional configuration of FIG. 7, it is necessary to shorten the Yb-doped fiber length and 975-nm pumping light that needs the wavelength control by temperature is used. However, as in this embodiment, by configuring in such a manner that the fiber amplifier portion is provided in the latter stage so that residual pumping light in the fiber laser portion can be utilized again, it is possible to use 915-nm pumping light as the pump LD 101.

More specifically, according to the laser light source device of this embodiment, even in a case where 1030-nm light is to be generated, it becomes possible to use a wavelength band in which the absorption spectrum of the Yb-doped fiber is broad. Accordingly, because the wavelength control by temperature is no longer necessary, not only can the device costs be reduced, but also power consumption can be reduced.

Also, in the laser light source device of this embodiment, because the residual pumping light in the fiber laser portion can be used as the pump source in the fiber amplifier portion in the latter stage, it is possible to input strong pumping light (pump strongly). Further, an output can be increased owing to the amplification effect.

FIG. 4 shows the output characteristics of 1030-nm light generated in the laser light source device of this embodiment. As has been described, it is possible to obtain about 10 times the output obtained in the conventional case. Moreover, when an output on the order of W is to be obtained in this wavelength range, the fiber overheats and deteriorates. However, by adopting the configuration of this embodiment, it is possible to prevent overheating and deterioration of the fiber.

By allowing 1030-nm light generated in the laser light source device of this embodiment to go incident on the wavelength conversion device using the non-linear optical effect (crystal) as described in the first embodiment above, it is possible to generate green light at 515 nm.

As has been described, by adopting the configuration of this embodiment, it becomes possible to generate 515-nm light, which cannot be oscillated by the conventional solid-state laser and is difficult to obtain at an output of 1 W or higher even with the use of the fiber laser.

It is thus possible to replace an argon ion gas laser that has been the mainstream with a compact light source consuming less power.

Third Embodiment

The laser light source devices described in the first embodiment and the second embodiment above are used as a display light source in a laser display (image display), a backlight light source in a liquid crystal display, or a light source in an ornament illuminator.

As an example of the use of the laser light source devices descried in the first embodiment and the second embodiment above, an example of the configuration of a laser display (image display) to which the laser light source devices are applied will be described using FIG. 5.

Laser light sources 1201*a* through 1201*c* of three colors, red (R), green (G), and blue (B), are used in the laser light source device. A GaAs semiconductor laser having the wavelength of 638 nm is used as the red laser light source 1201*a* and a GaN semiconductor laser having the wavelength of 465 nm is used as the blue laser light source 1201*c*. Also, a wavelength conversion green light source device provided with a wavelength conversion element that shortens the wavelength of the infrared laser to half is used as the green laser light source 1201*b*. The laser light source device described in the first embodiment or the second embodiment above is used as the wavelength conversion green light source device.

Laser beams emitted from the light sources 1201*a*, 1201*b*, and 1201*c* are scanned two-dimensionally by reflective two-dimensional beam scanning means 1202*a* through 1202*c*, respectively, and illuminate diffusion plates 1203*a* through 1203*c*, respectively. The laser beams of the respective colors scanned two-dimensionally on the diffusion plates 1203*a* through 1203*c* pass through field lenses 1204*a* through 1204*c*, respectively, after which they are introduced to two-dimensional spatial light modulation elements 1205*a* through 1205*c*, respectively.

Herein, the image data is divided to R, G and B, and a color image is formed as respective signals are inputted into the two-dimensional spatial light modulation elements 1205*a* through 1205*c* and combined in a dichroic prism 1206. The image thus combined is projected onto a screen 1208 by a projection lens 1207. In this instance, the diffusion plates 1203*a* through 1203*c* are disposed in front of the two-dimensional spatial light modulation elements 1205*a* through 1205*c*, respectively, as speckle noise removing portions. The speckle noises can be reduced by oscillating the diffusion plates 1203*a* through 1203*c*. Lenticular lenses or the like may be used as the speckle noise removing portions.

Also, in this embodiment, one semiconductor laser is used for each color. However, it is possible to adopt the structure that makes it possible to obtain outputs of two to eight semiconductor lasers in the form of a single fiber output using a bundle fiber. In this case, the wavelength spectrum width is extremely broad in the order of several nm, and the occurrence of speckle noises can be suppressed by this broad spectrum.

The image display described above may be configured as a type that projects light from behind the screen (rear projection display).

As the two-dimensional spatial light modulation elements 1205*a* through 1205*c*, reflective spatial modulation elements (DMD mirror) formed of integrated microminiature mirrors are available. However, two-dimensional spatial modulation elements using liquid crystal panels and two-dimensional spatial modulation elements using galvanometer mirrors and mechanical micro switches (MEMS) are also available.

In the case of light modulation elements, such as the reflective spatial modulation elements, the MEMS, and the galvanometer mirrors, having the light modulation characteristics to which the polarization components are least susceptible, the optical fiber to propagate higher harmonics is not necessarily a polarization maintaining fiber, such as the PANDA fiber. On the contrary, in the case of using the two-dimensional spatial modulation elements using liquid crystal panels, it is preferable to use the polarization maintaining fibers because the modulation characteristics and the polarization characteristics are related to a large extent.

As other examples of the use of the laser light source devices described in the first embodiment and the second embodiment above, the configurations of a backlight light source in a liquid crystal display and a light source in an ornament illuminator to which the laser light source devices are applied will now be described using FIG. 6A and FIG. 6B, respectively.

Figure 6A:
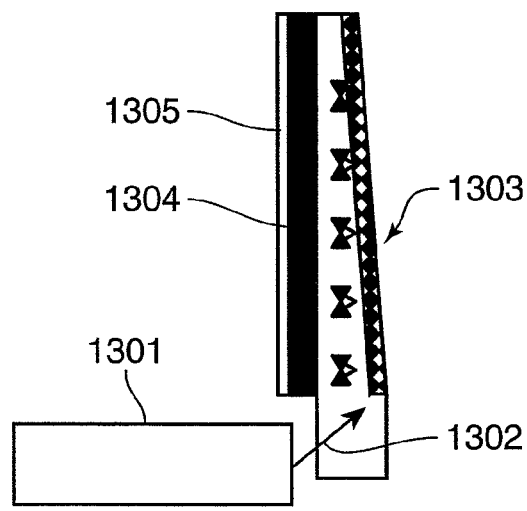
FIG. 6A is a view showing an example of a liquid crystal display using the laser light source device of the invention.

FIG. 6A shows the configuration of a liquid crystal display using the laser light source devices of the first embodiment and the second embodiment described above.

It is configured in such a manner that a laser beam 1302 generated from a laser light source device 1301 of the first embodiment and the second embodiment described above uniformly illuminates a liquid crystal panel 1304 by a waveguide plate and diffusion plate 1303.

In this instance, light that can be generated from the laser light source device 1301 is single polarized light (linearly polarized light). It is therefore possible to use single polarized light as light to illuminate the liquid crystal panel 1304, which can eliminate the need for a polarizer on the light-incident side that is necessary in a conventional case where a fluorescent tube or a light emitting diode is used as the light source. Hence, not only is it possible to reduce the material costs, but it is also possible to increase an amount of transmission light by about 10 to 20%. A brighter liquid crystal display can be thus manufactured.

Figure 6B:
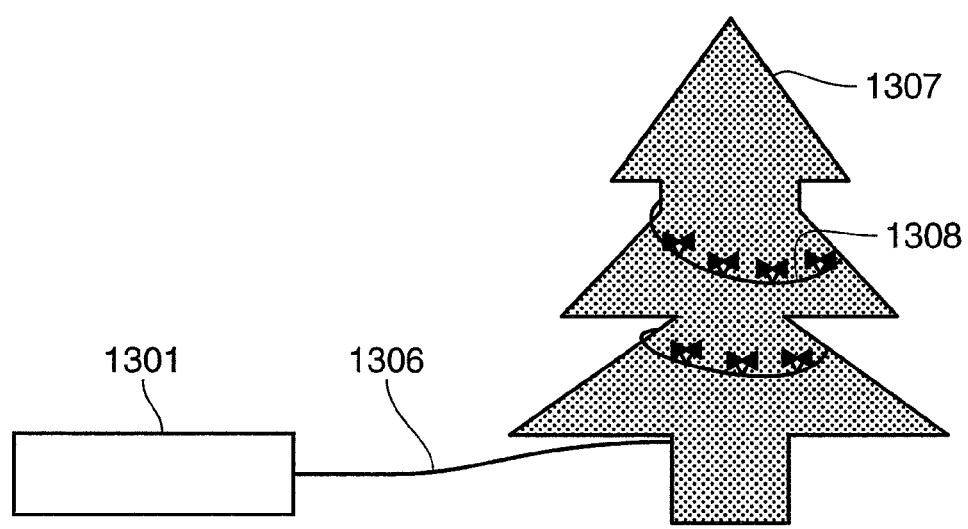
FIG. 6B is a schematic view showing an example of a light source in an ornament illuminator using the laser light source device of the invention.

FIG. 6B shows the configuration of the light source in an ornament illuminator using the laser light source devices of the first embodiment and the second embodiment described above.

A laser beam emitted from a laser light source device 1306 of the first embodiment and the second embodiment described above is carried to a subject 1308 to be illuminated, such as the buildings and trees, via a visible light propagation fiber 1307. A fiber 1309 attached to the subject 1308 to be illuminated is provided with a light scattering mechanism and is thereby capable of irradiating light to the outside. The light scattering mechanism can be formed by manufacturing a fiber grating or setting the refractive index of the fiber coating to about 1.43. Also, by allowing linearly polarized light having plural wavelengths to go incident on the fiber, it is possible to control colors.

Figure 13:
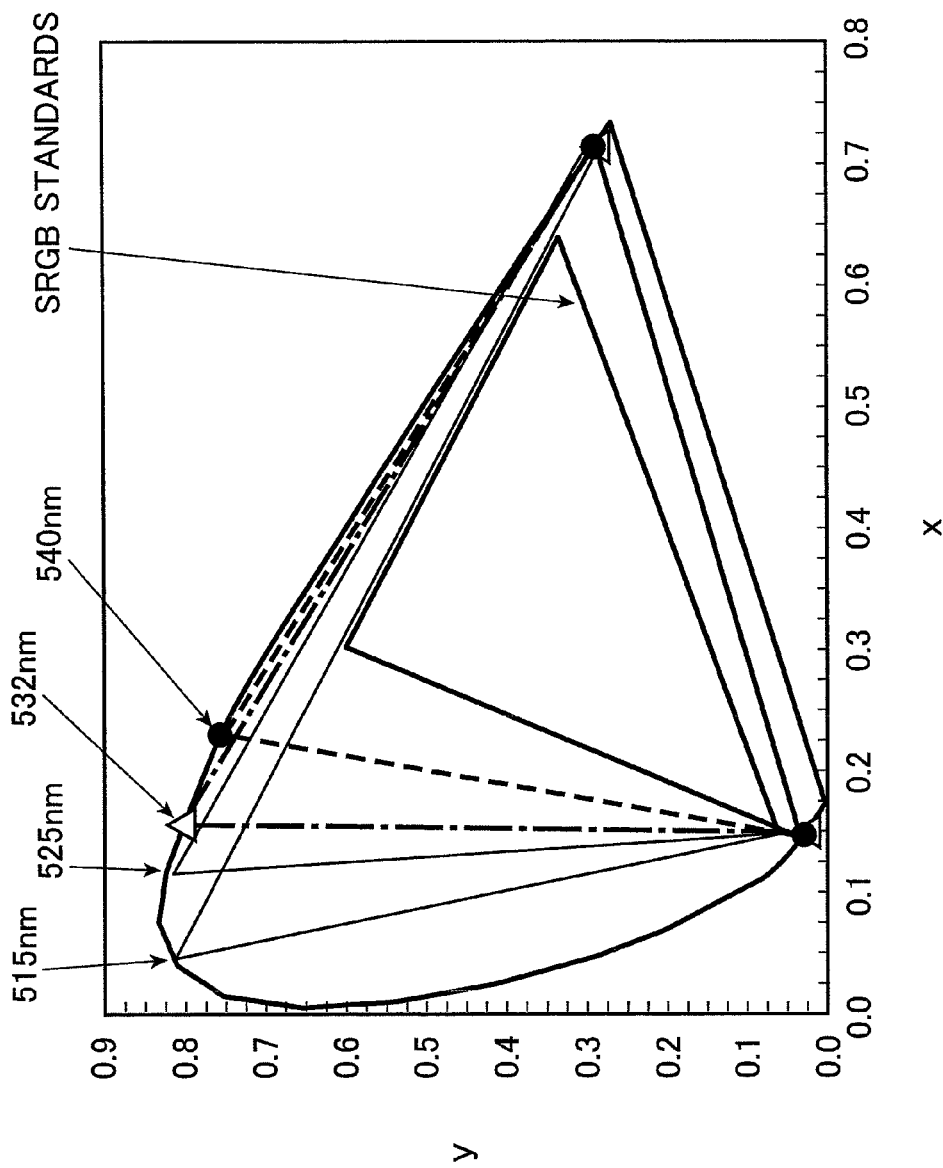
FIG. 13 is a chromaticity diagram showing the relation between the color reproduction range of the S-RGB standards and the color reproduction range for each wavelength used as green light.

FIG. 13 shows the chromaticity diagram to compare the color reproduction range by a conventional display and a color reproduction range when a monochromatic light source, such as a laser, is used. In the conventional display, images are displayed in the color reproduction range of the S-RGB standards. The color reproduction range shown herein is the one in a case where InGaN semiconductor laser light at 450 nm is used as a blue light source and AlGaAs semiconductor laser light at 635 nm is used as a red light source while the wavelength of green light is varied. When the green light is within the range of 535 to 515 nm, the color reproduction range can be expanded by 150 to 200% in comparison with the S-RGB standards.

It should be appreciated that the display light source in the laser display (image display), the backlight light source in the liquid crystal display, and the light source in the ornament illuminator described in the embodiment above are mere examples and other examples are available as well.

The configurations of the fiber laser light sources of the first embodiment and the second embodiment described above are particularly effective when a polarization maintaining fiber is used. This is because a loss in the absorption characteristic of the polarization maintaining fiber is larger than the absorption characteristic of a single mode fiber capable of generating randomly polarized light, and the fiber length has to be shortened further. Because it is necessary that the polarization direction is predetermined in the applications described in the third embodiment, the fiber laser light source devices of the first embodiment and the second embodiment are extremely useful.

It should be appreciated that the laser light source devices described in the respective embodiments above are mere examples, and it goes without saying that other embodiments are available as well.

In the first embodiment and the second embodiment described above, one single emitter laser diode having the oscillation wavelength of 915 nm is used as the pump LD 101. The invention, however, is not limited to this configuration. As is shown in FIG. 14, it may be configured in such a manner that two laser diodes, that is, a laser diode 101*a* having the oscillation wavelength of 915 nm and a laser diode 101*b* having the oscillation wavelength of 975 nm are used and light emitted from each is combined in a combiner 109, so that the pumping light at 975 nm is chiefly used for the pumping in the fiber laser portion and the pumping light at 915 nm is chiefly used for the pumping in the fiber amplifier portion. By increasing the intensity of the seed light from the fiber laser portion, it is possible to increase an output of the laser light source device. Also, it is possible to mitigate deterioration of the temperature characteristic of the laser light source device caused by the temperature characteristic of the laser diode 101*b* having the oscillation wavelength of 975 nm.

The invention can be summarized as follows from the embodiments described above. That is, a laser light source device of the invention includes: a fiber laser portion having a first double clad fiber doped with a rare earth as a laser active substance, a second double clad fiber in which is formed a pair of fiber gratings to determine an oscillation wavelength of the first double clad fiber, and a laser light source emitting pumping light to the first double clad fiber to pump the first double clad fiber; a fiber amplifier portion formed of a double clad fiber doped with a rare earth as a laser active substance and amplifying oscillation light of the fiber laser portion; and a wavelength conversion module converting the oscillation light amplified by the fiber amplifier portion to higher harmonics. The fiber laser portion pumps the fiber amplifier portion by emitting to the fiber amplifier portion the pumping light remaining in the first double clad fiber on which the pumping light of the laser light source has been incident.

In the laser light source device described above, because the residual pumping light in the fiber laser portion is used as the pump light source in the fiber amplifier portion, it is possible to prevent deterioration of the fiber that raises a problem when generating light at a high output. Further, the output can be further enhanced without having to additionally provide a pump light source for the fiber amplifier portion. It is thus possible to obtain a sufficient output as the light source applied to an image display using a laser. Accordingly, an image display using this light source is capable of widening the color reproduction range in comparison with a conventional solid-state laser.

Further, laser light in a 915-nm band in which the absorption spectrum of the rare-earth fiber is broad can be used as pumping light in the fiber laser portion. Accordingly, the need to accurately control the temperature of the pump laser is eliminated and a Peltier element can be omitted. Power consumption can be therefore reduced.

In the laser light source device described above, it is preferable that an oscillation wavelength of the laser light source is 900 to 950 nm.

According to this configuration, should a wavelength fluctuation occur in the pumping light of the laser light source due to a temperature change, it is still possible to make a variance in absorption amount of the pumping light in the double clad fiber small. Accordingly, there is no need to control the temperature of the laser light source accurately. The cooling mechanism of the laser light source can be thus simplified.

In the laser light source device described above, it is preferable that the laser light source includes a first laser light source having an oscillation wavelength of 975 nm and a second laser light source having an oscillation wavelength of 915 nm, and that pumping light emitted from the first laser light source and pumping light emitted from the second laser light source are combined.

According to this configuration, it is possible to use light having the oscillation wavelength of 975 nm emitted from the first laser light source chiefly for the pumping in the fiber laser portion and light having the oscillation wavelength of 915 nm emitted from the second light source chiefly for the pumping in the fiber amplifier portion. It is thus possible to increase an output of the laser light source device by increasing the intensity of the seed light from the fiber laser portion. Further, it is possible to mitigate deterioration of the temperature characteristics of the laser light source device.

In the laser light source device described above, it is preferable that an oscillation wavelength of the fiber laser portion is 1030 to 1070 nm.

According to this configuration, it is possible to obtain the wavelength of 515 to 535 nm that is desirable as the green light source in an image display, such as a laser display.

In the laser light source device described above, it is preferable that the first and second double clad fibers are polarization maintaining fibers.

According to this configuration, because laser light in a particular polarization direction can be generated, it is possible to provide laser light suitable to an image display that requires single polarized light.

In the laser light source device described above, it is preferable that the fiber laser portion further has a third double clad fiber in which is formed a polarization portion that transmits only a particular polarization component of oscillation light of the first double clad fiber on a light-exiting side of the first double clad fiber.

According to this configuration, oscillation light in the fiber laser portion can be single polarized light. It is thus possible to emit linearly polarized light suitable to an image display.

In the laser light source device described above, it is preferable that the polarization portion is a coil-shaped portion having a specific curvature radius.

According to this configuration, it is possible to obtain single polarized light while suppressing an output loss of the oscillation light from the fiber laser portion.

In the laser light source device described above, it is preferable that a cutoff wavelength of the third double clad fiber is 980 nm and a core diameter thereof is 5.5 to 6.5 μm, and the curvature radius of the coil-shaped portion is 10 to 15 mm.

According to this configuration, it is possible to obtain single polarized light while suppressing an output loss of the oscillation light from the fiber laser portion without causing deterioration of the fiber.

In the laser light source device described above, it is preferable that a cutoff wavelength of the third double clad fiber is 850 nm and a core diameter thereof is 5.5 to 6.5 μm, and the curvature radius of the coil-shaped portion is 10 to 45 mm.

According to this configuration, it is possible to obtain single polarized light while suppressing an output loss of the oscillation light from the fiber laser portion without causing deterioration of the fiber.

In the laser light source device described above, it is preferable that the higher harmonics of the wavelength conversion module is visible light having a wavelength of 400 to 700 nm.

According to this configuration, it is possible to achieve a green light source capable of enhancing the color reproducibility of an image display.

In the laser light source device described above, it is preferable that the wavelength conversion module includes a second harmonic generation module that outputs light having half a wavelength of the oscillation wavelength of the fiber laser portion.

According to this configuration, it is possible to obtain higher harmonics having half the wavelength from the oscillation light in the fiber laser portion.

In the laser light source device described above, it is preferable that an oscillation wavelength of the fiber laser portion is 1030 to 1070 nm and a wavelength of the higher harmonics of the wavelength conversion module is 515 to 535 nm.

According to this configuration, it is possible to obtain light having the wavelength of 515 to 535 nm that is desirable as the green light source in an image display, such as a laser display.

In the laser light source device described above, it is preferable that an output of the pumping light of the laser light source is 20 to 25 W and an oscillation wavelength of the fiber laser portion is 1030 to 1070 nm.

According to this configuration, it is possible to obtain light having the wavelength of 515 to 535 nm that is desirable as the green light source in an image display, such as a laser display.

In the laser light source device described above, it is preferable that a length of the first double clad fiber is 3 m or shorter.

According to this configuration, it is possible to obtain light having the wavelength of 515 to 535 nm that is desirable as the green light source in an image display while setting the oscillation wavelength of the fiber laser portion to 1030 nm.

An image display of the invention includes any one of the laser light source devices described above, and a display portion that displays an image thereon using laser light emitted from the laser light source device.

The image display described above can achieve a broad color reproduction range.

An illuminator of the invention includes any one of the laser light source devices described above and a propagation fiber that propagates laser light emitted from the laser light source device, and the laser light emitted from the laser light source device is irradiated from the propagation fiber by changing a refractive index of the propagation fiber partially.

The illuminator described above can achieve scattering of light suitable to illumination.

INDUSTRIAL APPLICABILITY

According to the invention of the present application, it is possible to prevent fiber deterioration caused by the residual pumping light, which is a problem in the fiber laser light source, in particular, a fiber laser light source of linearly polarized light at 1070 nm or shorter. Hence, because the reliability is enhanced and the output can be amplified by the fiber amplifier in the latter stage without any limitation of the pumping light output, an output of the oscillation light can be increased more than the one in the conventional case. Moreover, by using the light source formed by combining the fiber laser light source and the wavelength conversion module, it is possible to apply the invention to a laser display or the like that is not only brighter and larger than ever but also has high color reproducibility.

The invention claimed is:
1. A laser light source device, comprising:
a fiber laser portion having a first double clad fiber doped with a rare earth as a laser active substance, a second double clad fiber in which is formed a pair of fiber gratings to determine an oscillation wavelength of the first double clad fiber, and a laser light source emitting pumping light to the first double clad fiber to pump the first double clad fiber;
a fiber amplifier portion formed of a double clad fiber doped with a rare earth as a laser active substance and amplifying oscillation light of the fiber laser portion; and
a wavelength conversion module converting the oscillation light amplified by the fiber amplifier portion to higher harmonics,
wherein:

the fiber laser portion, the fiber amplifier portion, and the wavelength conversion module are disposed sequentially in this order;

the fiber laser portion pumps the fiber amplifier portion by emitting to the fiber amplifier portion the pumping light remaining in the first double clad fiber on which the pumping light of the laser light source has been incident; and the fiber laser portion further has a third double clad fiber in which is formed a polarization portion that transmits only a particular polarization component of oscillation light of the first double clad fiber on a light-exiting side of the first double clad fiber.

2. The laser light source device according to claim 1, wherein:

an oscillation wavelength of the laser light source is 900 to 950 nm.

3. The laser light source device according to claim 1, wherein:

the laser light source includes a first laser light source having an oscillation wavelength of 975 nm and a second laser light source having an oscillation wavelength of 915 nm;

pumping light emitted from the first laser light source and pumping light emitted from the second laser light source are combined; and the fiber laser portion is pumped chiefly by oscillation light having the oscillation wavelength of 975 nm of the laser light source and emits to the fiber amplifier portion chiefly oscillation light having the oscillation wavelength of 915 nm remaining in the first double clad fiber on which the pumping light of the laser light source has been incident.

4. The laser light source device according to claim 1, wherein:

an oscillation wavelength of the fiber laser portion is 1030 to 1070 nm.

5. The laser light source device according to claim 1, wherein:

the first and second double clad fibers are polarization maintaining fibers.

6. The laser light source device according to claim 1, wherein:

the polarization portion is a coil-shaped portion having a specific curvature radius.

7. The laser light source device according to claim 6, wherein:

a cutoff wavelength of the third double clad fiber is 980 nm and a core diameter thereof is 5.5 to 6.5 μm, and the curvature radius of the coil-shaped portion is 10 to 15 mm.

8. The laser light source device according to claim 6, wherein:

a cutoff wavelength of the third double clad fiber is 850 nm and a core diameter thereof is 5.5 to 6.5 μm, and the curvature radius of the coil-shaped portion is 10 to 45 mm.

9. The laser light source device according to claim 1, wherein:

the higher harmonics of the wavelength conversion module is visible light having a wavelength of 400 to 700 nm.

10. The laser light source device according to claim 1, wherein:

the wavelength conversion module includes a second harmonic generation module that outputs light having half a wavelength of the oscillation wavelength of the fiber laser portion.

11. The laser light source device according to claim 1, wherein:

an oscillation wavelength of the fiber laser portion is 1030 to 1070 nm and a wavelength of the higher harmonics of the wavelength conversion module is 515 to 535 nm.

12. The laser light source device according to claim 1, wherein:

an output of the pumping light of the laser light source is 20 to 25 W and an oscillation wavelength of the fiber laser portion is 1030 to 1070 nm.

13. The laser light source device according to claim 1, wherein:

a length of the first double clad fiber is 3 m or shorter.

14. An image display, comprising:

the laser light source device set forth in claim 1; and a display portion that displays an image thereon using laser light emitted from the laser light source device.

15. An illuminator, comprising:

the laser light source device set forth in claim 1; and a propagation fiber that propagates laser light emitted from the laser light source device, wherein the laser light emitted from the laser light source device is irradiated from the propagation fiber by changing a refractive index of the propagation fiber partially.

* * * * *